(12) United States Patent
Lai et al.

(10) Patent No.: US 10,793,073 B2
(45) Date of Patent: Oct. 6, 2020

(54) MODULAR CAMERA STRUCTURE

(71) Applicant: AUTOEQUIPS TECH CO., LTD., New Taipei (TW)

(72) Inventors: I-Jen Lai, New Taipei (TW); Yi-Che Huang, New Taipei (TW)

(73) Assignee: AUTOEQUIPS TECH CO., LTD., New Taipei (TW)

( * ) Notice: Subject to any disclaimer, the term of this patent is extended or adjusted under 35 U.S.C. 154(b) by 51 days.

(21) Appl. No.: 16/169,618

(22) Filed: Oct. 24, 2018

(65) Prior Publication Data

US 2019/0126829 A1 May 2, 2019

(30) Foreign Application Priority Data

Oct. 27, 2017 (TW) .............................. 106215872 U

(51) Int. Cl.
| | | |
|---|---|---|
| *B60R 1/08* | (2006.01) | |
| *B60R 1/12* | (2006.01) | |
| *B60R 1/06* | (2006.01) | |
| *B60Q 9/00* | (2006.01) | |

(Continued)

(52) U.S. Cl.
CPC ............. *B60R 1/081* (2013.01); *B60Q 9/008* (2013.01); *B60R 1/0605* (2013.01); *B60R 1/12* (2013.01); *B60R 11/04* (2013.01); *B60R 2001/1253* (2013.01); *B60R 2011/004* (2013.01);

(Continued)

(58) Field of Classification Search
CPC .... B60Q 1/525; B60Q 2900/10; B60Q 5/006; B60Q 9/008; B60R 11/04; B60R 1/0605; B60R 1/081; B60R 1/12; B60R 2001/1253; B60R 2011/004; B60R 2300/8026; B60R 2300/8093
See application file for complete search history.

(56) References Cited

U.S. PATENT DOCUMENTS

| | | | |
|---|---|---|---|
| 6,678,001 B1 * | 1/2004 | Elberbaum ...... | G08B 13/19619 348/373 |
| 2015/0232028 A1 * | 8/2015 | Reardon ................... | B60R 1/00 348/148 |
| 2017/0050581 A1 * | 2/2017 | Buss ................... | H04N 5/2254 |

OTHER PUBLICATIONS

"Blind-side and backup camera for Rand McNally trcuk and RV GPS." https://web.archive.org/web/20130805090621/http://www.dieselboss.com/Travrout/gps_camera_system_rand_tnd_garmin.htm. Aug. 5, 2013. (Year: 2013).*

(Continued)

*Primary Examiner* — Farzana Hossain
(74) *Attorney, Agent, or Firm* — Rabin & Berdo, P.C.

(57) ABSTRACT

A modular camera structure to be mounted on the rear-view mirror frame on either lateral side of a large vehicle to eliminate rear-view blind spots includes an annular base, a cover, and a fastening member. The annular base has an annular projection on which an image-recording device is placed, and a curved groove on the opposite side. The cover has a lower opening coupled with the annular projection such that the image-recording device is secured in the cover and has its lens exposed through an upper opening of the cover. A recessed portion of the fastening member and the curved groove of the annular base can engage with two opposite sides of the rear-view mirror frame respectively, before locking members lock two ends of the fastening member to the annular base to secure the annular base and the fastening member tightly to the rear-view mirror frame in a clamping manner.

16 Claims, 8 Drawing Sheets

(51) Int. Cl.
*B60R 11/04* (2006.01)
*B60R 11/00* (2006.01)

(52) U.S. Cl.
CPC ............... *B60R 2300/8026* (2013.01); *B60R 2300/8093* (2013.01)

(56) References Cited

OTHER PUBLICATIONS

"Blind-side and backup camera for Rand McNally trcuk and RV GPS." Figure 1—Camera. https://web.archive.org/web/20130622232427/http://www.dieselboss.com/camera/gpscam2_rand1.jpg Jun. 22, 2013 (Year: 2013).*

"Blind-side and backup camera for Rand McNally trcuk and RV GPS." Figure 2—Camera 2d. https://web.archive.org/web/20170614203755/http://www.dieselboss.com/camera/gpscam2d.jpg. Jun. 22, 2013 (Year: 2013).*

"Blind-side and backup camera for Rand McNally trcuk and RV GPS." Figure 3—Rand camera. https://web.archive.org/web/20130807025833/http://www.dieselboss.com/camera/rand_camera_side.jpg. Aug. 7, 2013. (Year: 2013).*

* cited by examiner

MODULAR CAMERA STRUCTURE

BACKGROUND OF THE INVENTION

1. Technical Field

The present invention relates to automotive cameras and more particularly to a modular camera structure for use on a large vehicle to help ensure driving safety.

2. Description of Related Art

A large vehicle such as a bus, heavy truck, dump truck, or semi-trailer truck tends to have blind spots in the driver's field of view due to the long wheelbase, large turning radius, high driver's seat, or great total length of the vehicle. If the driver fails to pay due attention while driving, or a nearby road user is ignorant of such blind spots, traffic accidents are very likely to occur. This is one major reason why large vehicles are prone to traffic accidents.

Practically, a large vehicle is almost always equipped with a plurality of rear-view mirrors that are set at different viewing angles; however, as the great vehicle length and viewing distances impose serious limitations on the fields of view of those mirrors, blind spots still exist, which invites accidents particularly when the vehicle is running, changing lanes, turning, or reversing. One common approach to eliminating the blind spots is to add detecting or image-recording devices to the vehicle, but the way these devices are installed differs from one vehicle structure to another. Moreover, the installation process often causes damage to the exterior structure, if not the internal components, of a vehicle. The additional devices also require maintenance once installed.

In view of the above, it is an important issue in the related industries to provide a camera module for use on a vehicle to eliminate blind spots and enhance driving safety without causing structural damage to the vehicle during installation.

BRIEF SUMMARY OF THE INVENTION

The primary objective of the present invention is to provide a modular camera structure that can be mounted securely on the rear-view mirror frame on either lateral side of a large vehicle without damaging the structure of the vehicle. It is highly desirable that the modular camera structure can be easily mounted on a vertical or horizontal member of the rear-view mirror frame and record images of the lateral blind spots of the vehicle from the most appropriate viewing angle to enhance driving safety.

The technical means of the present invention to achieve the above objective lies in a modular camera structure that is designed mainly to eliminate rear-view blind spots. The modular camera structure essentially includes an annular base, an image-recording device, a cover, and a fastening member. The annular base is formed with a hole at the center. An annular projection is protrudingly provided on the surface of one side of the annular base, and the image-recording device is placed on the annular projection. At least one curved groove is concavely provided in the surface of the opposite side of the annular base so that the annular base can engage with a rear-view mirror frame of a large vehicle via the curved groove. The cover is hollow inside, is configured to accommodate the image-recording device, and is formed with a lower opening and an upper opening. The lower opening is configured to couple with the annular projection so that the image-recording device is secured in the cover and the annular base. The upper opening, on the other hand, allows the lens of the image-recording device to face outward. The fastening member has a middle section formed with a recessed portion. The fastening member can engage with the rear-view mirror frame of the large vehicle via the recessed portion from the side of the rear-view mirror frame that is opposite the annular base, before two locking members are respectively used to couple two ends of the fastening member to the annular base and thereby mount the annular base and the fastening member tightly on the rear-view mirror frame of the large vehicle in a clamping manner.

Preferably, the annular base further has a wing extending from each of two lateral sides of the annular base.

Preferably, the annular projection of the annular base is provided with at least one concave section.

Preferably, the cover is formed with at least one notch in a lateral side, and the notch is adjacent to the lower opening.

Preferably, the notch of the cover corresponds in position to the concave section.

Preferably, the image-recording device is a spherical camera.

Preferably, the largest width of the upper opening of the cover is smaller than the diameter of the image-recording device.

Preferably, the modular camera structure is further provided with a warning unit on a lateral side of the cover.

Preferably, the warning unit is a warning light, a buzzer, or a loudspeaker.

BRIEF DESCRIPTION OF THE SEVERAL VIEWS OF THE DRAWINGS

The foregoing objective, features, and functions of the present invention can be better understood by referring to the following detailed description of some preferred embodiments of the invention in conjunction with the accompanying drawings, in which.

DETAILED DESCRIPTION OF THE INVENTION

Figure 1:
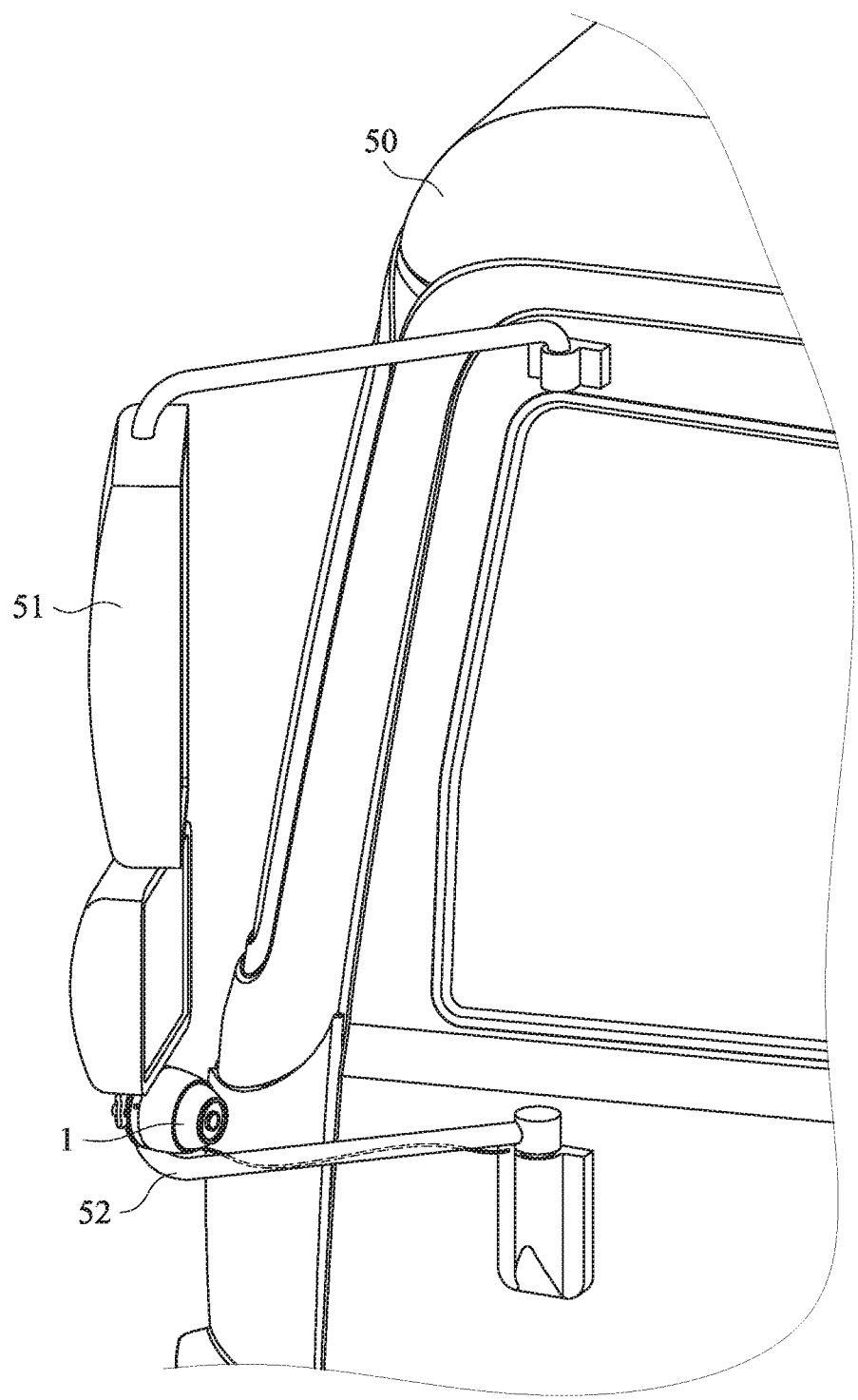
FIG. 1 shows a state of use of a preferred embodiment of the present invention.
Figure 2:
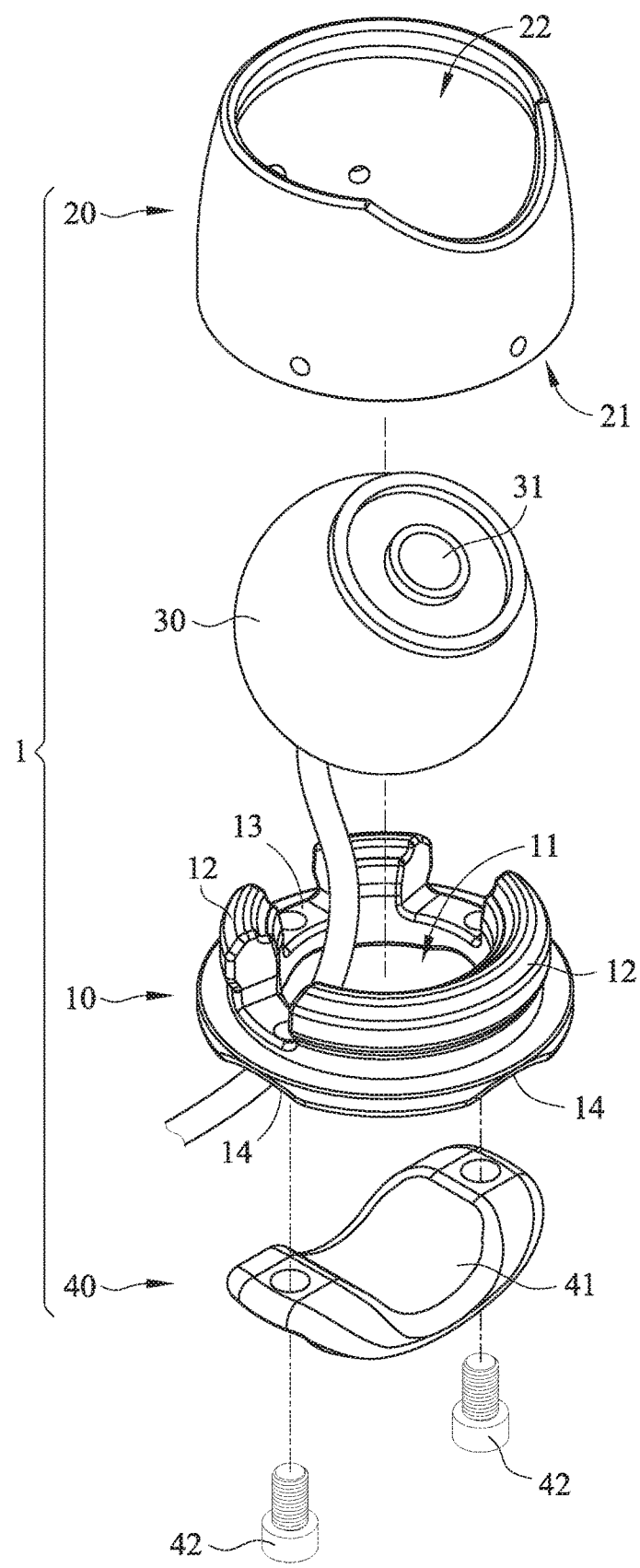
FIG. 2 and FIG. 3 are exploded perspective views of the preferred embodiment in FIG. 1.
Figure 3:
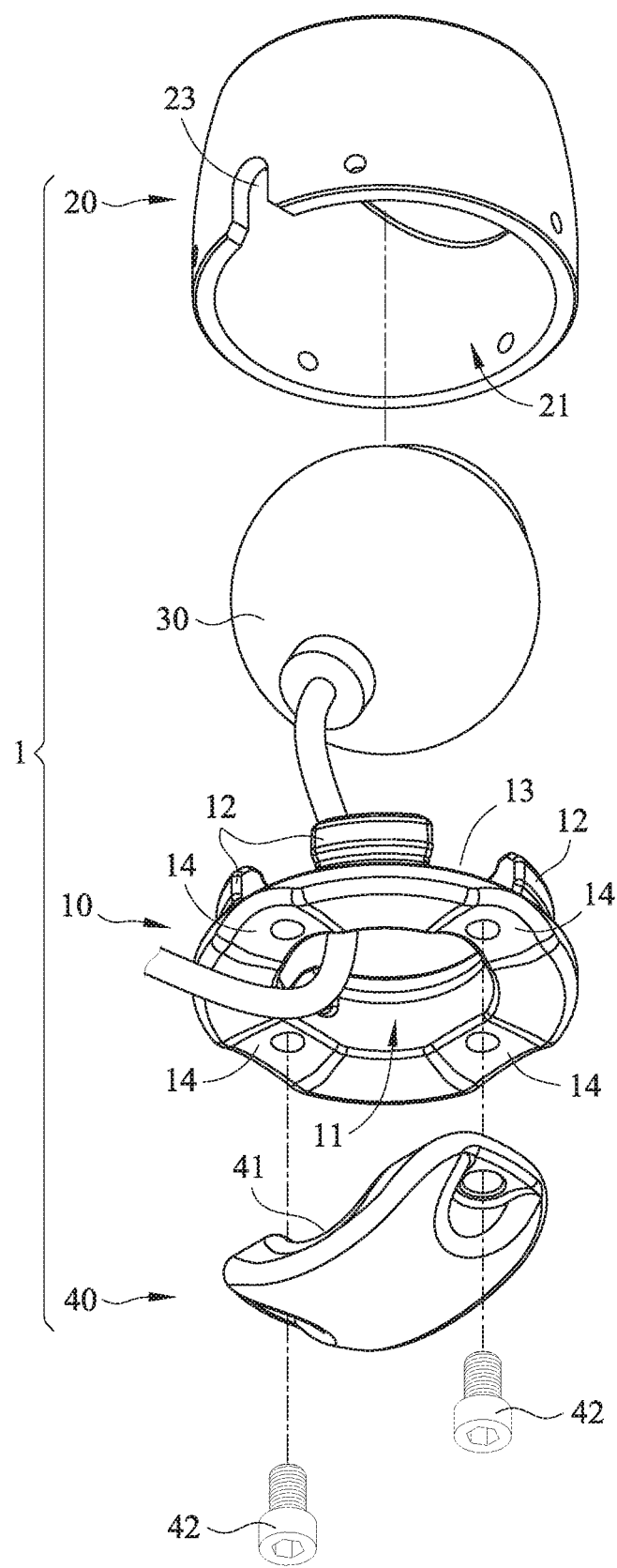

Referring to FIG. 1 to FIG. 3 for the first embodiment of the present invention, the modular camera structure 1 is designed mainly for use on a large vehicle 50 and includes an annular base 10, a cover 20, an image-recording device 30, and a fastening member 40. This modular structure can be mounted securely on the rear-view mirror 51-supporting frame (hereinafter referred to as the rear-view mirror frame 52) on either lateral side of the large vehicle 50.

The annular base 10 is basically a horizontal ring-shaped body, with a hole 11 formed at the center. The upper surface of the ring-shaped body is formed with an annular projection 12 that protrudes upward and on which the image-recording device 30 is to be placed. The lower surface of the ring-shaped body is concavely formed with at least one curved groove 14 so that the annular base 10 can engage with the rear-view mirror frame 52 of the large vehicle 50 via the curved groove 14.

The cover 20 is a hollow housing with an interior space configured to accommodate the image-recording device 30. The top and bottom sides of the cover 20 are formed with an upper opening 22 and a lower opening 21 respectively. The lower opening 21 has a larger diameter than the image-recording device 30. The upper opening 22 has a smaller diameter than the image-recording device 30 but allows the lens 31 of the image-recording device 30 to face outward. Once the cover 20 and the annular base 10 are put together, with the image-recording device 30 placed therebetween, the image-recording device 30 is accommodated in the interior space of the cover 20, and the lower opening 22 is coupled with the annular projection 12 of the annular base 10. This configuration allows the image-recording device 30 to be firmly fixed in the cover 20 and the annular base 10 at an appropriate angle.

The fastening member 40 is configured to couple with the annular base 10 from the side of the rear-view mirror frame 52 that is opposite the annular base 10 (hereinafter referred to as the second side of the rear-view mirror frame 52) so that the fastening member 40 and the annular base 10 are tightly secured to the rear-view mirror frame 52 in a clamping manner. In this embodiment, the middle section of the fastening member 40 has a recessed portion 41 of an appropriate width and curvature for engaging with the second side of the rear-view mirror frame 52 of the large vehicle 50, and the two ends of the fastening member 40 are each formed with a locking hole through which a locking member 42 of an appropriate length can pass in order to connect the fastening member 40 to the bottom side of the annular base 10, thereby not only locking the fastening member 40 and the annular base 10 tightly together from two opposite sides of the rear-view mirror frame 52, but also securing the fastening member 40 and the annular base 10 to the rear-view mirror frame 52 in a clamping manner.

In one feasible embodiment, the image-recording device 30 is a spherical camera, whose wires can be guided downward through the hole 11 of the annular base 10 during assembly. If the wires are to be guided from a lateral side of the image-recording device 30, the annular projection 12 of the annular base 10 may be formed with at least one concave section 13, and the cover 20 may be formed with at least one notch 23 corresponding in position to the concave section 13 (e.g., on a lateral side of the cover 20 and adjacent to the lower opening 21) so that, when the annular base 10 and the cover 20 are put together, with the concave section 13 aligned with the notch 23, the concave section 13 and the notch 23 form a passage in communication with the interior space of the cover 20, allowing the wires to be guided laterally. In contrast to the conventional automotive cameras, which are generally required to be embedded in the vehicle structure, the modular camera structure 1 of the present invention can be assembled and installed with ease and causes no damage to the vehicle structure.

Figure 4:
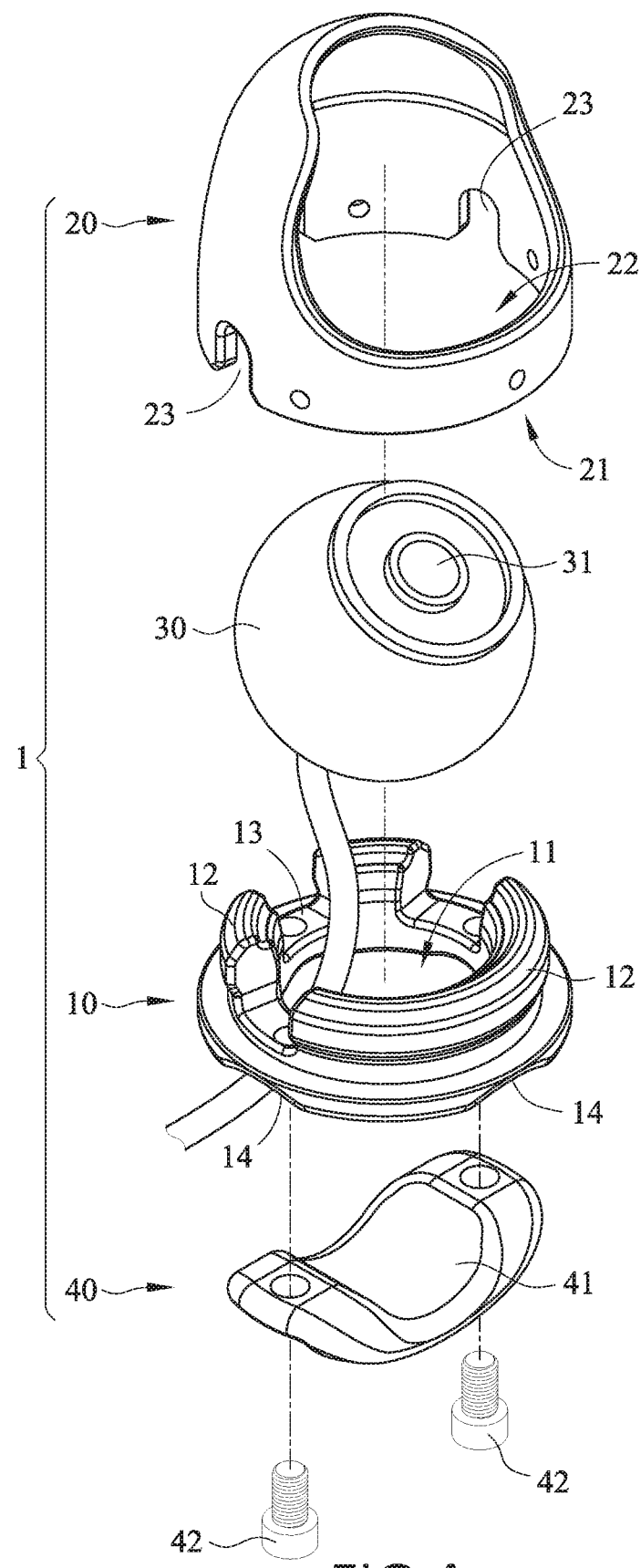
FIG. 4 is an exploded perspective view of another preferred embodiment of the invention.
Figure 5:
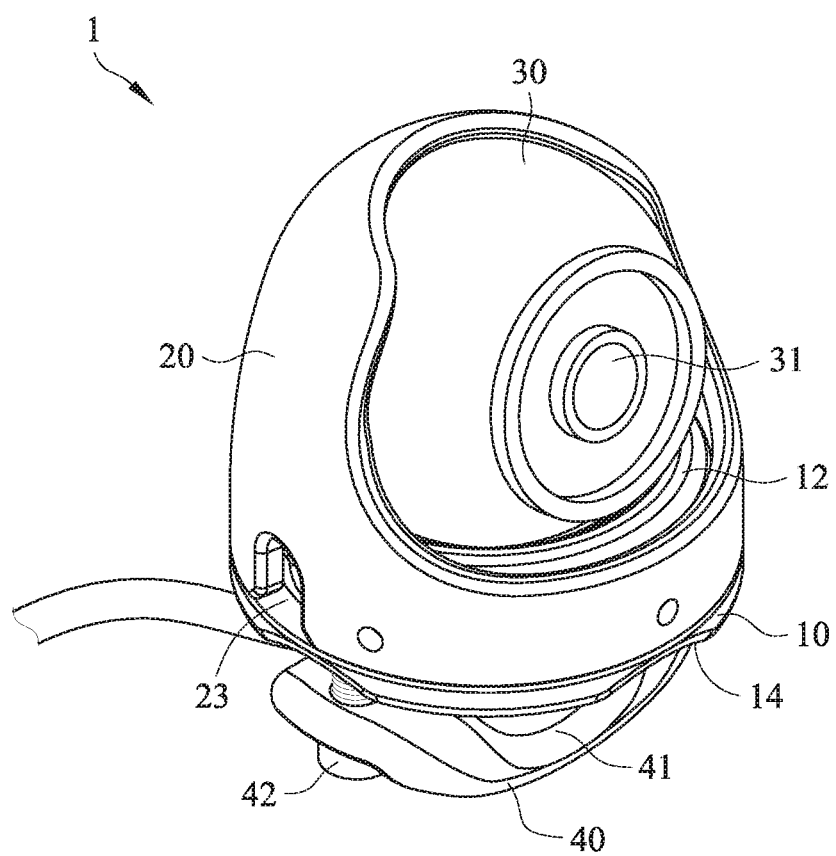
FIG. 5 is an assembled perspective view of the preferred embodiment in FIG. 4.

FIG. 4 and FIG. 5 show the second embodiment of the present invention. The second embodiment also includes an annular base 10, a cover 20, an image-recording device 30, and a fastening member 40 as its major components, wherein the annular base 10, the image-recording device 30, and the fastening member 40 are identical to those in the first embodiment, the only different component being the cover 20. The cover 20 in the second embodiment has the same basic configuration as its counterpart in the previous embodiment, i.e., having a hollow interior for accommodating and securing the image-recording device 30, and a lower opening 21 to be coupled with the annular projection 12 of the annular base 10. The cover 20 in the second embodiment is different in that the upper opening 22 forms the front half of the cover 20 while the rear half of the cover 20 forms a protective guard. This alternative design is suitable for use when images are to be recorded in a lateral direction with respect to the installation direction of the modular camera structure, making it possible to mount the image-recording device 30 at the most appropriate angle regardless of the angle of the rear-view mirror frame 52.

Figure 6:
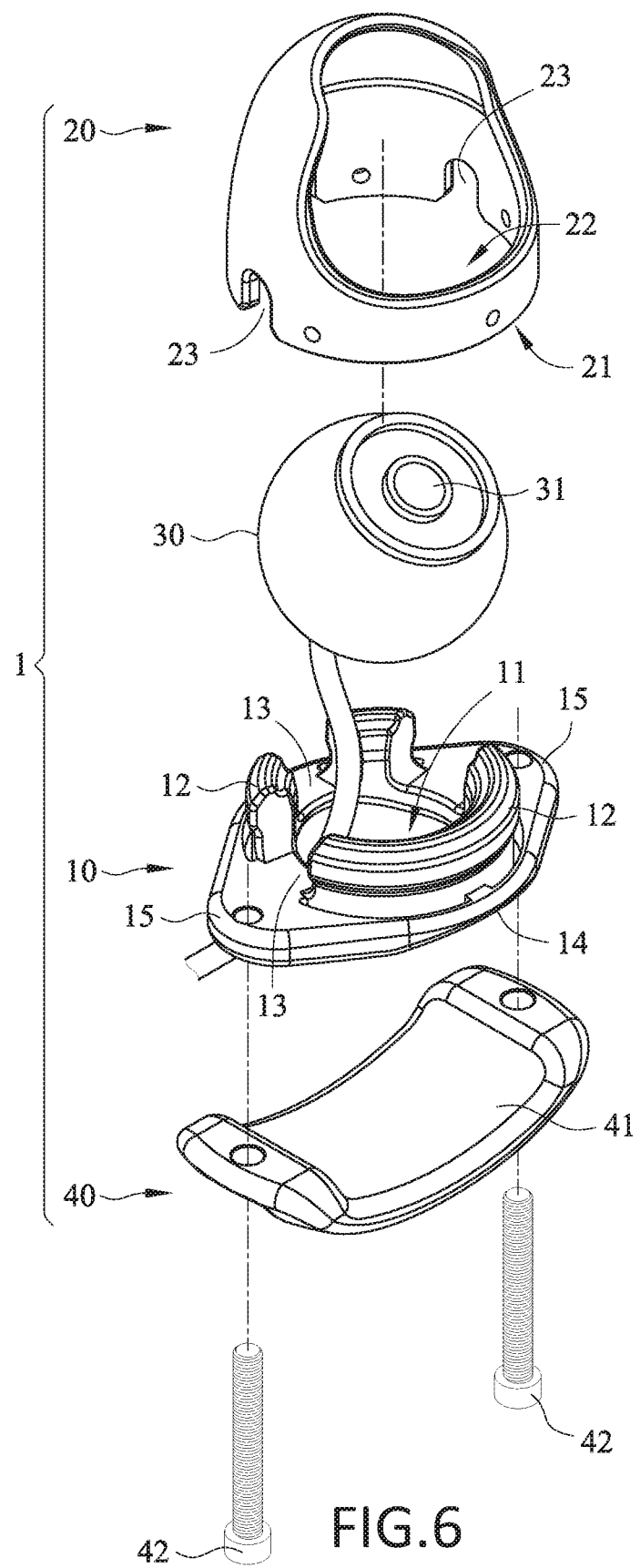
FIG. 6 and FIG. 7 are exploded perspective views of yet another preferred embodiment of the invention.
Figure 7:
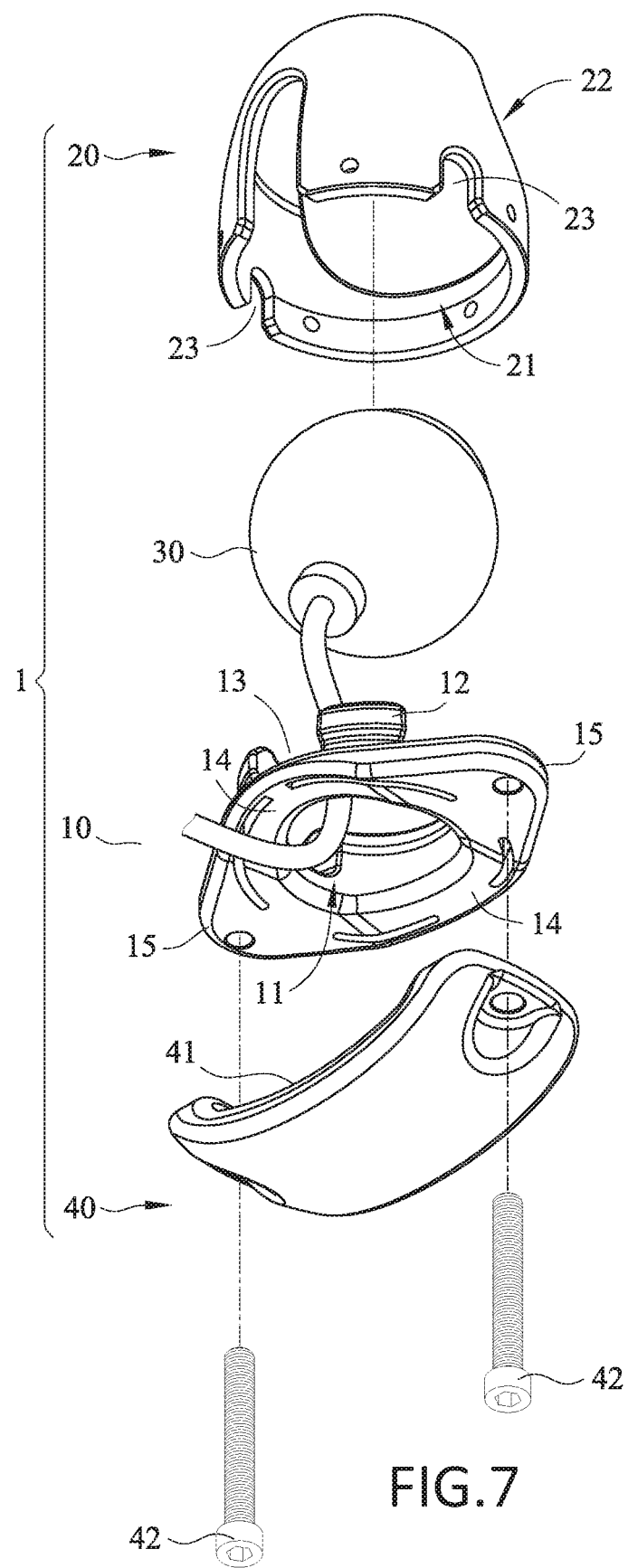
Figure 8:
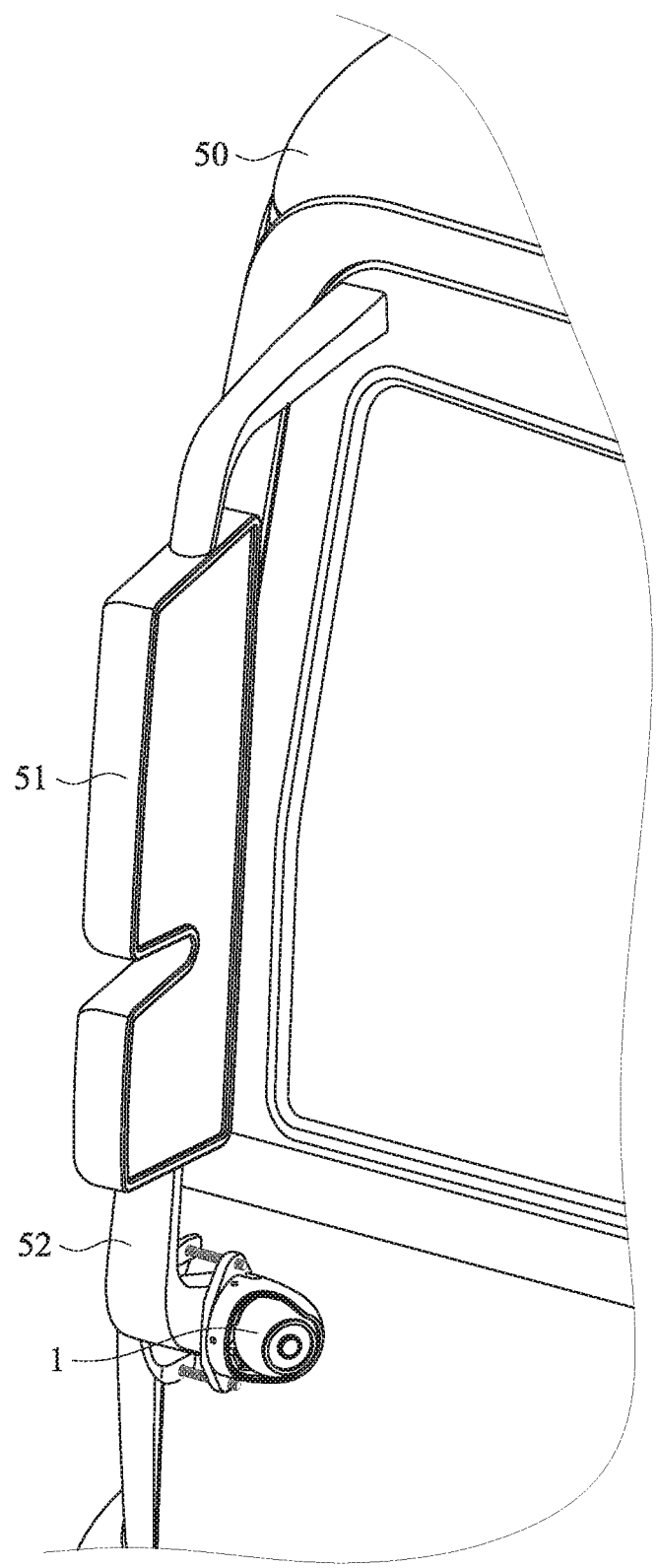
FIG. 8 shows a state of use of the preferred embodiment in FIG. 6 and FIG. 7.

FIG. 6 to FIG. 8 show the third embodiment of the present invention. The third embodiment also includes an annular base 10, a cover 20, an image-recording device 30, and a fastening member 40 as its major components, wherein the annular base 10 and the fastening member 40 are different from their respective counterparts in the previous embodiments.

In this embodiment, the annular base 10 includes not only such structural features as the hole 11, the annular projection 12, the concave section 13, and the curved groove 14, but also a pair of wings 15 that extend from two opposite lateral sides of the annular base 10 respectively, and the fastening member 40 is extended accordingly such that the two ends of the fastening member 40 correspond to the wings 15 respectively. By passing two elongated locking members 42 through the locking holes at the two ends of the fastening member 40 and the locking holes in the two lateral wings 15 of the annular base 10 respectively, the fastening member 40 and the annular base 10 can be locked together from two opposite sides of the rear-view mirror frame 52 and thereby mount the modular camera structure 1 securely on the rear-view mirror frame 52. The wings 15 and the extended fastening member 40 enable the modular camera structure 1 to adapt to rear-view mirror frames 52 of various widths.

The modular camera structure 1 of the present invention is so designed that it can be easily installed without damaging the original structure of a vehicle and, by means of proper accessories, adapt to rear-view mirror frames 52 of different tilt angles (e.g., whether the frame member on which to install the modular camera structure 1 is horizontal, vertical, inclined, or otherwise) or of different shapes (e.g., whether the frame member on which to install the modular camera structure 1 has a circular, rectangular, elliptical, octagonal, or other cross-sectional shape), thereby achieving the intended effect of blind spot elimination.

In one feasible embodiment, the modular camera structure 1 is further configured for use in conjunction with a warning unit (not shown). For example, a warning unit such as a warning light or buzzer may be provided on a lateral side of the cover 20 and controlled by a system of the vehicle on which the modular camera structure 1 is installed, in order to produce a warning (e.g., flashing light or a buzzing sound) outside the vehicle whenever the vehicle changes lanes or turns. A small loudspeaker may also be mounted at the aforesaid position and connected communication-wise to a microphone for use by the driver of the vehicle in order to produce verbal warnings, which help ensure driving safety even more effectively.

The foregoing description serves only to expound the technical concept and features of the present invention, with a view to enabling a person skilled in the art to understand and implement the contents of the invention, and is not intended to be restrictive of the scope of the invention. All equivalent changes and modifications based on the concept disclosed herein shall fall within the scope of the appended claims.

What is claimed is:

1. A modular camera structure that is configured for mounting an image-recording device having a lens onto a rear-view mirror frame on either lateral side of a large vehicle to eliminate rear-view blind spots, comprising:
   (a) an annular base that is concentrically formed, that has a hole defined therethrough, and that comprises:
      (i) an annular projection that is protrudingly provided on a surface of a side of the annular base and that is configured to accommodate placement thereon of said image-recording device; and
      (ii) at least one curved groove that is concavely provided in a surface of an opposite side of the annular base such that the annular base is configured to engage said rear-view mirror frame of said large vehicle via the curved groove;
   (b) a cover that has a hollow interior for accommodating the image-recording device, and that has defined therethrough:
      (i) a first opening configured to couple with the annular projection and thereby secure the image-recording device between the cover and the annular base; and
      (ii) a second opening configured to allow the lens of the image-recording device to face away from the annular base; and
   (c) a fastening member having a middle section formed with a recessed portion configured to engage the rear-view mirror frame of the large vehicle via the recessed portion from a side of the rear-view mirror frame that is opposite the annular base, the fastening member having two ends, each end of the two ends being configured to couple with the annular base via a locking member so as to securely mount the annular base and the fastening member tightly on the rear-view mirror frame of the large vehicle in a clamping manner.

2. The modular camera structure of claim 1, wherein the annular base further comprises a pair of wings extending respectively from two lateral sides of the annular base.

3. The modular camera structure of claim 1, wherein the annular projection of the annular base is provided with at least one concave section.

4. The modular camera structure of claim 3, wherein the cover has a lateral side having at least one notch adjacent to the first opening.

5. The modular camera structure of claim 4, wherein the notch of the cover corresponds in position to the concave section.

6. The modular camera structure of claim 5, wherein the image-recording device is a spherical camera.

7. The modular camera structure of claim 6, wherein the image-recording device has a diameter, and wherein the second opening of the cover has a widest width that is smaller than the diameter of the image-recording device.

8. The modular camera structure of claim 5, further comprising a warning unit provided on a lateral side of the cover.

9. The modular camera structure of claim 8, wherein the warning unit is a warning light, a buzzer, or a loudspeaker.

10. The modular camera structure of claim 2, wherein the annular projection of the annular base is provided with at least one concave section.

11. The modular camera structure of claim 10, wherein the cover has a lateral side having at least one notch adjacent to the first opening.

12. The modular camera structure of claim 11, wherein the notch of the cover corresponds in position to the concave section.

13. The modular camera structure of claim 12, wherein the image-recording device is a spherical camera.

14. The modular camera structure of claim 13, wherein the image-recording device has a diameter, and wherein the second opening of the cover has a widest width that is smaller than the diameter of the image-recording device.

15. The modular camera structure of claim 12, further comprising a warning unit provided on a lateral side of the cover.

16. The modular camera structure of claim 15, wherein the warning unit is a warning light, a buzzer, or a loudspeaker.

* * * * *